United States Patent [19]

Igarashi et al.

[11] 4,066,354
[45] Jan. 3, 1978

[54] MICROFILM APPARATUS

[75] Inventors: Shunkichi Igarashi, Yokohama; Takeshi Okano, Amagasaki; Sho Takahama, Takarazuka; Yoshio Hakamata, Tokyo, all of Japan

[73] Assignee: Fuji Photo Film Co., Ltd., Minami-ashigara, Japan

[21] Appl. No.: 695,720

[22] Filed: June 14, 1976

[30] Foreign Application Priority Data

June 19, 1975 Japan .................................. 50-75193

[51] Int. Cl.² .................................................. G03B 29/00
[52] U.S. Cl. .................................................. 355/28
[58] Field of Search ........................ 355/39, 77, 27–30, 355/40, 64, 65

[56] References Cited

U.S. PATENT DOCUMENTS

| 2,751,814 | 6/1956 | Limberger | 355/28 |
| 2,769,369 | 11/1956 | Oiler | 355/28 |
| 3,289,530 | 12/1966 | Samain | 355/77 X |
| 3,354,779 | 11/1967 | Brown | 355/27 X |

Primary Examiner—Donald A. Griffin
Attorney, Agent, or Firm—Sughrue, Rothwell, Mion, Zinn and Macpeak

[57] ABSTRACT

Microfilm apparatus suited to use in a small establishment and employing standard microfilm in roll form. Successive microfilm units each comprising an image-carrier portion constituted by a set number of frames which have been exposed in an exposure compartment in the upper portion of the apparatus to image-wise light reflected from documents to be microfilmed and a tab portion for carrying an identification code indicative of the content of documents recorded on the image-carrier portion are detached from the remainder of the film and immediately processed in a development processing compartment in the lower portion of the apparatus, remaining film being available for production of subsequent microfilm units, and processed microfilm units being moved to the exterior of the apparatus. The apparatus also includes blower means which blows air from the exposure compartment and into and through the development processing compartment, and to the exterior of the apparatus, whereby the exposure compartment is sealed against corrosive vapors produced in the development processing compartment.

2 Claims, 7 Drawing Figures

MICROFILM APPARATUS

BACKGROUND OF THE INVENTION

1. Field of the Invention

The present invention relates to a microfilm apparatus. More particularly the invention relates to a microfilm apparatus suited to a microfilm system designed to meet the needs of to an establishment requiring only a small amount of data to be recorded in microfilm form.

2. Description of the Prior Art

Recording of documents or other data has become comparatively common practice because of the advantages offered of economy of space required for storing records and of improved facility and lowered cost of transport of records, by post, for example. One type of known microfilm system employs a continuous roll of 16 mm. or 35 mm. film on which are produced the latent images of a succession of documents and which is subsequently processed and developed, to give one or more files of microfilm copies of documents. In another known microfilm system microfilm copies of a set of related documents are produced on a so-called microfiche film, which is a special type of film in the form of a sheet on which film frames are disposed in a rectangular array, for example a 5 × 12 array. Both these systems are essentially suited to organizations requiring large amounts of data to be stored in microfilm form. For a comparatively small office or other establishment in which it is occasionally required to microfilm a small number of documents at a time, for example twelve, the system employing microfiches is uneconomic, since for each microfilm film produced most of the frames on a microfiche are not used. There is liable to be similar waste with the system employing roll-film, particularly when it is required to immediately post microfilm copies of a set of documents. With the system employing roll-film it is of course possible to avoid wastage by not processing a roll of film until all the frames thereof have been exposed. However in this case, there is generally a problem of turnaround time, i.e., since the rate at which microfilm copies of documents are produced is low, microfilming a sufficient number of documents to use an entire roll of film extends over a long period, and there is therefore a long wait until microfilm copies carried by the initial frames of the film are obtained.

A further disadvantage of currently marketed conventional microfilm systems is that the associated apparatus generally requires comparatively skilled staff for actuation thereof. In a large establishment it is of course possible for there to be specialist staff employed in a microfilm department, but in a small establishment this is obviously uneconomical.

A microfilm apparatus suited to use in a small establishment is that disclosed in Japanese Patent Publication No. 49-91456, in which a roll of electrophotosensitive material is used as the microfilm material, successive frames of this material being electrically charged, exposed, and then developed in the apparatus. This apparatus has the advantage that production of only a small number of microfilm copies of documents at a time is permitted, but has the disadvantage that to permit the stages of charging, exposure and development to be kept separate it is necessary to allow a considerable space between adjacent frames of the film material, with the result that the number of microfilm copies obtainable from a roll of film material is limited, or the frames must be small. Another disadvantage is that since the power of resolution of currently known electrophotosensitive material is inferior to that of film material including a layer or layers of silver halide emulsion, the apparatus is generally unsuited to production of microfilm copies of drawings, or similar material. In addition to these disadvantages there is also the disadvantage that initial cost and cost of maintenance of the equipment are high.

It is accordingly object of the present invention to provide a microfilm apparatus which is compact, easy to maintain, and suited to employment in a small office or similar establishment.

It is another object of the invention to provide a microfilm apparatus which employs film material including a layer of silver halide emulsion thereby making it possible to obtain microfilm copies of high resolution, which makes it possible to produce independent sets of a few microfilm copies of documents at a time, and which may be easily actuated by non-specialist staff.

A further object of the invention is to provide a microfilm apparatus which includes an exposure compartment for production of latent images on film material and a development and processing compartment for immediate development and processing of a set of exposed film frames, and which comprises means for sealing the exposure compartment to vapours produced during development of film, whereby corrosion of said processing compartment is prevented.

SUMMARY OF THE INVENTION

In accomplishing these and other objects there is provided according to the present invention a microfilm apparatus wherein successive portions of film provided in roll form are moved past an exposure station whereat frames of the film may be exposed to light carrying the images at reduced magnification of documents to be copied. The film may be considered to be divided into successive sets of a specific number of frames, for example twelve, each set of frames being preceded by a tab portion which has a length equal to six frames, for example, and which is not employed for carrying images of documents but for recording numerical or other data or symbols identifying the set of documents photographed on the following set of twelve frames. During exposure of image-carrier frames of the film, the film is advanced a distance equal to one frame length each time an external push-button is actuated, whereby successive frames are brought to an exposure station. When twelve complete frames have been exposed, the film roll is automatically moved a distance equal to six frame lengths, which movement brings the last exposed frame to a point slightly beyond a cut-off station, whereat there is provided a cutter unit which is actuated to cut the film subsequent to this six frame length advance thereof, whereby a film unit carrying latent images of photographed documents is separated from the remainder of the roll of film. At this time, between the cutter station and the exposure station there is a length of unexposed film which constitutes the tab portion of the next microfilm unit, and the front end of the microfilm unit which has just been severed from the remainder of the film roll is engaged by a first pair of rolls in a series of advance rolls which are actuated subsequent to completion of cutter action at the cut-off station. The advance rolls cause the detached microfilm unit to be moved through a processing compartment wherein the exposed film frames are developed and receive other suitable treatment to produce microfilm copies which are ready to use, and the microfilm unit is then moved to the exterior of the apparatus.

The microfilm unit thus obtained is stored in a pocket of a jacket having a plurality of pockets each of which may contain a microfilm unit, and suitably has dimensions such that the unexposed tab portion of a film unit projects therefrom. Identification of the documents recorded by the image-carrier portion of a microfilm unit may be recorded manually, or by provision of an optical system which is supplementary to the main optical system for exposure of film frames may be recorded automatically, for example upon exposure of the first frame of the image-carrier portion of the film unit.

Thus, according to the invention it is made possible to rapidly obtain microfilm copies of a small number of documents, and there is only a small amount of waste if it is required to microfilm less than the set number of documents at a time. Further, despite this small-scale production, it is possible to use high-quality film and so obtain microfilm copies of good resolution.

A better understanding of the present invention may be had from the following full description of several preferred embodiments thereof when read in reference to the attached drawings, in which like numbers refer to like parts.

DESCRIPTION OF THE PREFERRED EMBODIMENTS

Figure 1:
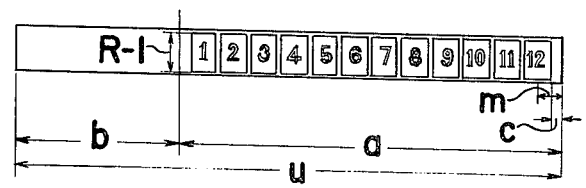
FIG. 1 is a plan view showing one microfilm unit according to the invention.

Referring to FIG. 1 there is shown one microfilm unit (u) of 16 mm. or 35 mm. film which is employed in the apparatus of the invention. Each microfilm unit (u) comprises a tab portion (b) constituting the leading end portion of the unit (u) and having a length equal to six frame lengths, and an image-carrier portion (a) which includes twelve frames which are successively exposed to images of documents. The first frame in the image carrier portion (a) is separated from the tab portion (b), and the last frame is separated from the trailing end of the image carrier portion a by a small distance (c), the distance in the drawing being equal to the sum of the distance (c) and one half the distance between centres of a pair of adjacent film frames. The separation distance (c) is selected in reference to the size of means for storing processed microfilm units (u). Film is initially provided in a continuous roll of film 9 and is cut into successive units (u), in a manner described below, by cutter means which separate the trailing edge of each unit (u) from the remainder of the roll of film 9.

Figure 2:
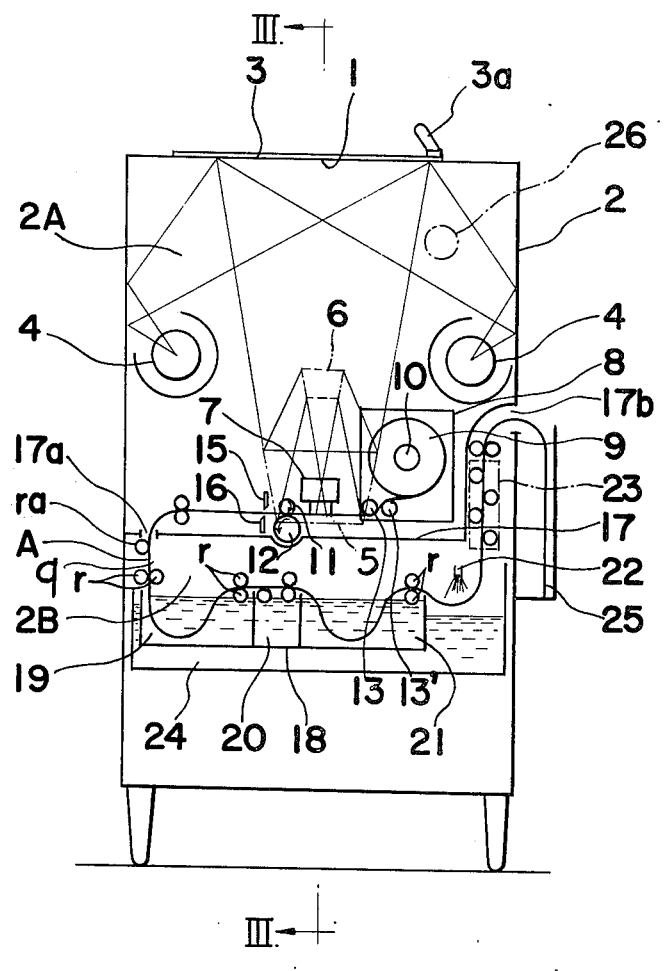
FIG. 2 is a vertical cross-sectional view showing principal elements of a microfilm apparatus according to one embodiment of the invention.
Figure 3:
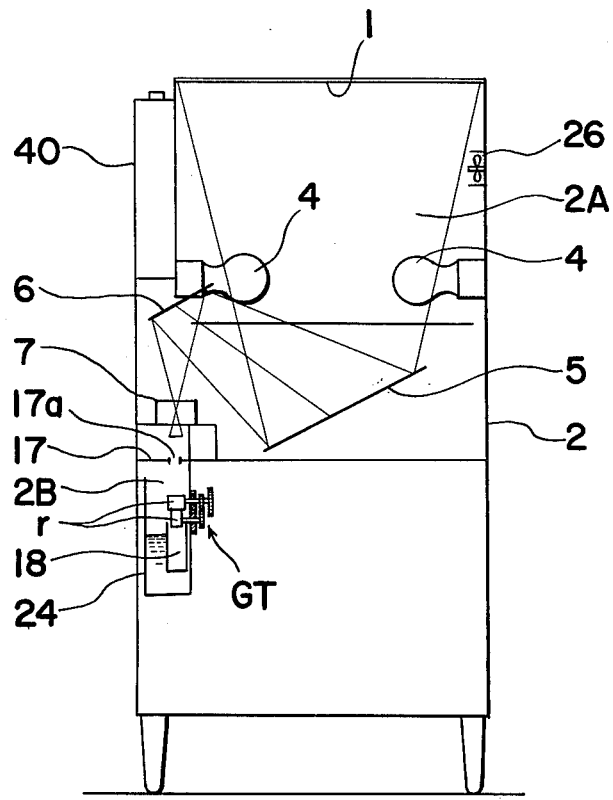
FIG. 3 is a cross-sectional view taken along the line III—III of FIG. 2.

Referring to FIGS. 2 and 3, the roll of film 9 is mounted on and unwindable from a reel 10 rotatably supported in a magazine 8 which is provided at a lower, offcentre portion of an exposure compartment 2A defined in the upper portion of a microfilm apparatus by walls of a main housing 2 and a partition 17. The lower portion of the apparatus below the partition 17 constitutes a development and processing compartment 2B. Film unwound from the roll 9 is passed between a pair of guide rollers 13 and 13' which are provided in a lower portion of the magazine 8, and passes along a flat guide portion defining an exposure station, the leading end of the film being engaged by a press roll 12 and a drive roll 11 which is actuable to unwind film from the roll 9. The drive roll 11 and press roll 12 are located on the opposite side of the exposure station to the guide rolls 13 and 13', whereby good flatness of film at the exposure station is maintained.

In the top wall of the main housing 2 there is provided a horizontal and transparent document rest 1, on which a document D of which it is required to obtain a microfilm copy is placed. Flatness of a document D placed on the document rest 1 is ensured by a comparatively heavy, opaque cover 3, which may completely cover the document rest 1, is pivotally mounted at one side, and has attached to the opposite side thereof a handle 3a by which the cover 3 may be raised, or lowered to the horizontal position shown in FIG. 2.

On opposite sides of an upper portion of the exposure compartment there are provided four light sources 4 with which are associated suitable reflector 4a and light from which is directed upwards onto mirrors or suitable reflector portions on side walls of the main housing 2, and then onto a document D on the document rest 1. Image-wise light is reflected downwards from the document D onto a first mirror 5, which, is provided below the level of the light sources 4, is inclined with respect to the document rest 1, and directs the image-wise light onto a second mirror 6 which is also provided below the light sources 4, is smaller than and is parallel to the first mirror 5, and is so disposed that it does not hinder direction of image-wise light from the document D to the first mirror 5. The second mirror 6 directs the image-wise light downwards to a focussing and reducing lens system 7 which focuses the image of the document D on the frame of the film 9 which is currently at the exposure station. Externally mounted on the main housing 2 there is a switch panel 40 provided with switches including a switch which is actuable to actuate the light sources 4 and simultaneously open a normally closed shutter means, not shown, which is provided immediately below the document rest 1, whereby the film frame 9a is exposed to image-wise light from the document D. Needless to say, the shutter may always be actuated at the same speed and to the same degree of opening, or actuation of the shutter may be controlled by a known means in accordance with reflectivity of the material of different documents.

Referring mainly to FIG. 2, after passing the exposure station and the location of the press roll 11 and drive roll 12 the film 9 is brought to a cut-off station whereat there is provided a movable, upper cutter 15 and a stationary, lower cutter 16 aligned with the upper cutter 15, the cutters 15 and 16 being provided on opposite sides of the film 9. The movable, upper cutter 15 is actuated to cut off successive units (u), actuation of the cutter 15 being effected in response to angular position of the drive roll 11, as described in greater detail below.

When the trailing end of a microfilm unit (u) has been brought to the cut-off station, the leading end portion thereof has been passed through an entry 17a defined in the abovementioned partition 17, moved downwards, and guided by a guide roller (ra) brought into engagement with a first pair of advance rolls (r) provided in the development and processing compartment 2B at a location, which is below and in line with the entry 17a. Needless to say, to ensure requisite forward movement of the microfilm unit 9 into engagement with the first pair of advance rolls (r), there may be provided between the cut-off station and the first pair of advance rolls (r) forwarding roll means, which are suitably actuated simultaneously with the drive roll 12.

Figure 5:
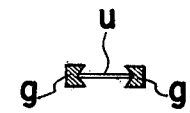
FIG. 5 is a schematic cross-sectional view of processing compartment guide means provided in the apparatus of FIG. 2.

A plurality of other advance rolls (r) and guide rolls (ra) are provided in the development and processing chamber 2B along a film advance path A which is defined between a pair of V-shaped guide elements (g) such as shown in cross-section in FIG. 5, the distance between the notch portions of the guides (g) being generally equal to the width of a microfilm unit (u). All the advance rolls (r) are actuated simultaneously by drive means not shown, acting through independent gear train means GT such as shown in FIG. 3, upon termination of action of the cutters 15 and 16, or upon actuation of external control means. Allowing for curvature of the microfilm unit (u), the distance between the first pair of advance rolls (r) and the cut-off station and between any two adjacent pairs of rolls (r) is slightly less than the total length of a microfilm unit (u), both ends of which are therefore always engaged by roll means.

In FIG. 2, when the advance rolls (r) are actuated, the detached microfilm unit (u) is moved thereby successively through a bath 19 containing developer solution, a bath 20 containing a rinsing liquid such as water, and a bath 21 containing a fixing solution, the baths 19, 20 and 21 together constituting a bath processing unit 18. The entire processing unit 18 is contained in a bath 24 containing water which is held at a steady temperature by heater and thermostat control means not shown, whereby the temperature in the baths 19, 20, and 21 is maintained at a requisite value. After leaving the processing unit 18 the microfilm unit is subjected to a spray of water directed thereonto by a spray unit 22 for removal of adhering fixing solution, is moved upwards through a drying unit 23 provided between an upwardly extending portion of the partition 17 and a wall of the main housing 2, and finally is moved through an exit 17b and into a receiver 25 which is provided on the exterior of the main housing 2 and from which the processed microfilm unit (u) may be subsequently removed by the user.

In FIGS. 2 and 3, in an upper portion of the exposure compartment 2A there is provided a blower 26 which acts to blow air from the exterior of the apparatus through the exposure compartment, through the entry 17a, through the development and processing compartment 2B, and through the exit 17b to the exterior of the apparatus. This air flow caused by the blower 26 acts to prevent vapors produced above the developing solution bath 19 from entering the exposure compartment 2A and so protects film 9 from such vapors prior to processing of film 9 and also prevents corrosion in the exposure compartment.

Figure 4:
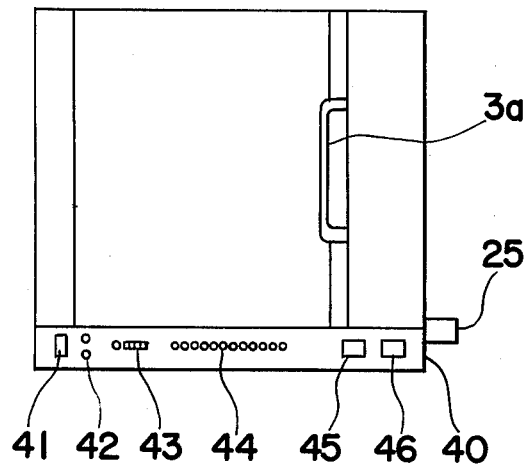
FIG. 4 is a top plan view of the apparatus of FIG. 2 showing layout of a control panel.

In FIG. 4, the control panel 40 has provided on an upper portion thereof, which is easily accessible to the user, a main power connection switch 41, a lamp 42 which lights if the temperature of processing solution in the bath 20 is not in a requisite range, in order to warn the user to temporarily halt processing of subsequent microfilm units (u), a counter 42 which indicates the number of microfilm units (u) remaining in the roll of film 9, an indicator lamps 44 which light successively as successive frames of a microfilm unit (u) are exposed a processing command switch 46, which, when a control mode switch 45a switchable to cause automatic control or manual control is set to a manual control position, is actuable to cause actuation of the advance roller (r), actuation of the rolls (r) being effected automatically upon cut-off of a microfilm unit (u), as described above, if the control mode siwtch 45a is set to the automatic control position, and the above-mentioned switch 46 for effecting exposure of a film frame at the exposure station.

Figure 6:
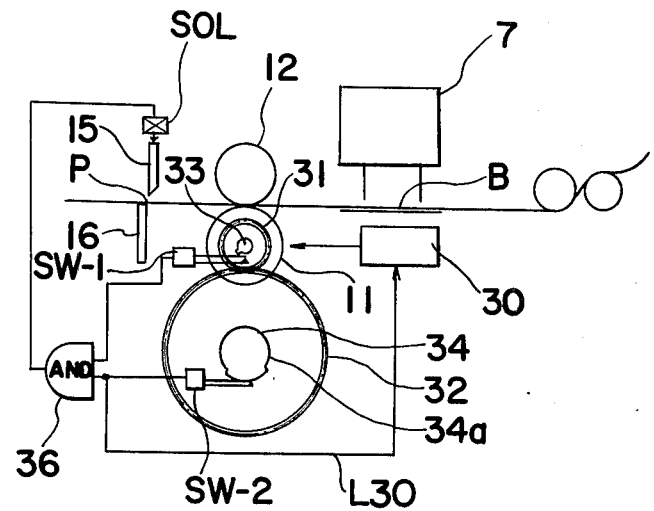
FIG. 6 is a schematic drawing showing a microfilm feed and cutter control circuit.

Reference in now had to FIG. 6 which shows a control circuit including an intermittent drive means 30, which normally acts to cause the microfilm drive roll 12 to rotate 1/6 of a revolution each time an actuation switch on the control panel 40 is pressed. Each time the drive roll 12 is rotated this amount, the microfilm 9 is advanced a distance equal to one frame length, whereby successive frames thereof are brought to the exposure station. In other words, the drive roll 12 must be rotated two complete revolutions in order to bring all twelve frames of a microfilm unit (u) to the exposure station. Exposure of successive frames is effected by actuation of a switch means to actuate the light sources 4 and open the shutter means provided below the document rest 1, as noted above.

In fixed, coaxial connection with the drive roll 12 there is a small diameter gear 31 which engages and drives a freely rotatable, large diameter gear 32, the ratio of the diameter of gear 32 to that of gear 31 being 3:1. The small diameter gear 31 carries a cam element 33 having a single, small projection which once every revolution of the gear 31 closes a normally open switch SW-1, thereby providing input to one input terminal of a two-input AND gate 36. The AND gate 36 may supply actuation input via a line L15 to a solenoid and plunger assembly SOL which when actuated causes the above mentioned upper cutter 15 to move downwards into sliding contact with the lower cutter 16 and so cut film 9. The large diameter gear 32 carries a cam 34 having a projecting portion 34a which defines a 120° segment of a circle centered on the rotatory axis of the gear 32 and which during ⅓ of each revolution of the gear 32 closes a normally open switch SW-2. When closed, the switch SW-2 supplies input to the other input terminal of the AND gate 36, and also supplies control input via a line L30 to the intermittent drive means 30, which causes the drive means 30 to advance the film 9 a distance equal to six frame lengths. The cam 31 and 34 are so mounted that closure of switch SW-2 by cam projection 34a commences immediately after cam 33 rotating with the drive roll 12 moves out of engagement with switch SW-1 and also after the last frame on the image-carrier portion of a microfilm unit (u) has been moved past the exposure station.

Since advance of film in a required manner depends on the cams 33 and 34 being maintained in a correct positional relationship to one another, in order to ensure maintenance of this relationship upon initial loading of film 9 in the apparatus, it is preferable that the drive roll 11 be fixable to prevent rotation thereof, and that it be possible to temporarily raise the press roll 12 out of contact with the drive roll 11, whereby the leading end portion of the film 9 may be easily led between the rolls 11 and 12 without risk of displacement of the drive roll 12, and hence of the cams 33 and 34 from required positions. Also, there is suitably provided conventional film advance and position indication means, to ensure accurate positioning of the film 9 to bring a frame thereof to the exposure station upon initial loading of the film 9.

Referring to FIGS. 2 and 6, presuming it is wished to obtain microfilm copies of twelve documents, subsequent to the first frame of a microfilm unit (u) being brought to the exposure station indicated at B in the FIG. 6, the light source and shutter actuation switch and film advance switch are each actuated twelve times. For occasions on which it is required to obtain microfilm copies of less than twelve documents, for example ten documents, after a latent image of the last document to be microfilmed has been formed on the film 9 the film advance switch is actuated two times without the light source and shutter actuation switch being actuated, or there may be provided a supplementary film advance switch which causes the film 9 to be moved two or more frame lengths at a time. In all cases, after latent images of documents required to be microfilmed have been formed on the film 9, the cam projection 34a closes the switch SW-2, whereby six frames of the film 9 are moved, unexposed, past the exposure station B, the last frame of the image-carrier portion (a) of the microfilm unit (u) is moved to a short distance past the cut-off station P, and, while switch SW-2 is still closed, switch SW-1 is closed by cam 31, whereby the cutter 15 is actuated to detach the microfilm unit (u) carrying latent images of the last set of documents. At this time, the six frames which have been moved unexposed past the exposure station B, being to the right of the cut-off station P as seen in FIG. 2 and therefore still attached to the remainder of the roll of film 9, constitute the tab portion (b') of the next microfilm unit (u'), and the first frame of this next microfilm unit (u') is at the exposure station B ready to be exposed.

The tab portion (b) of the preceding microfilm unit (u) is engaged by the first pair of advance rolls (r), which, together with the other pairs of advance rolls (r), are now actuated automatically, or by actuation of the processing command switch 45, and move the microfilm unit (u) through the abovedescribed development and processing stages and then into the receives 25.

Thus, a completed set of microfilm copies of a small number of documents may be obtained in a very short time, but the remainder of the roll of film 9 may be left in the microfilm apparatus ready for subsequent use, whereby problems of wastage are avoided.

Marking of an identification code, for example R-1 as shown in FIG. 1, on the tab portion (b) of each microfilm unit (u) in order to indicate the content of documents which are microfilmed on the microfilm unit (u), may be effected manually after processing of the microfilm unit (u), or, by provision in the microfilm apparatus of a supplementary optical system, identification codes may be produced automatically by photographic process on the tab portions (b) of successive microfilm units (u).

Needless to say, although it is considered that the abovenoted lengths of image-carrier portions (a) and tab portions (b) of microfilm units (u) are optimum lengths for the purposes of file production and storage in a small establishment, there no basic change of the apparatus or control circuit thereof if the number of frames on the image-carrier portion (a) of each film is ten, for example, or another number, or if the length of each tab portion (b) is not equal to six frame-lengths of the film 9. Also, of course by provision of an inhibition gate on the line L15 and an inhibition gate on the line L30, which may prevent supply of input to the solenoid and plunger assembly SOL and drive control means 30, respectively, and both of which are controlled by a suitable switch means provided on the control panel 40, it is possible to produce files of microfilm copies of documents greater in number than normal set number of frames on the image-carrier portion (a) of microfilm unit (u), or, alternatively, it is possible to dispense with the cams 33 and 34 and intermittent drive means 30, and to provide externally actuable control means for direct actuation of the drive roll 12 and cutters 15 and 16, thereby making it possible to obtain processed microfilm units (u) of variable length. However, in both these cases there is possible a drawback in that storage of microfilm units of different sizes is more difficult to effect in an ordered manner than storage of microfilm units of the same size.

Figure 7:
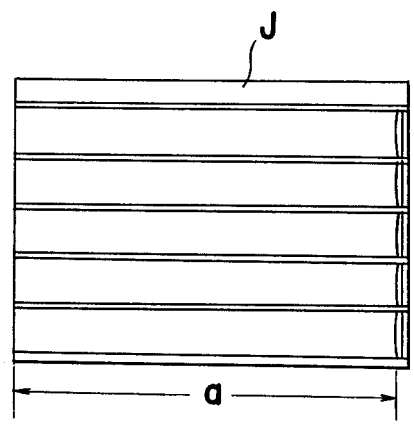
FIG. 7 is a plan view of a jacket for storage of a plurality of processed microfilm units.

Processed microfilm units (u) are suitably stored in pockets of a jacket J such as shown in FIG. 7. Each pocket of the jacket J suitably has dimensions such that it may completely accommodate the image-carrier portion (a) of a microfilm unit (u) but not the entire microfilm unit (u), whereby the tab portion (b) carrying an identification code projects from the pocket, so permitting easy retrieval of required microfilm units.

What is claimed is:

1. In a microfilm apparatus employing film which is in roll form and which includes at least one layer of a silver halide emulsion, and said apparatus includes means for exposing said film to image-wise reflected light from documents to be microfilmed and means for development processing of said exposed film, whereby microfilm copies of said documents may be obtained, the improvement wherein said apparatus comprises:
a main housing including outer walls;
partition wall means within said main housing, and acting in conjunction with the outer walls of said main housing to define an upper, exposure compartment and a lower, development processing compartment separate from said exposure compartment and to one side and below said exposure compartment;
means within said partition wall means for defining an entry opening which communicates between said exposure compartment and said development processing compartment;
means including an opening within said main housing outer wall at said development and processing compartment for defining an exit opening for said development processing compartment remote from said entry opening and communicating the interior of said development processing compartment to the exterior of said apparatus;
an exposure system within said exposure compartment including a horizontal, transparent document rest provided at the upper portion of said exposure compartment, a focussing lens system to one side of said exposure compartment overlying the upper portion of said development processing compartment, mirror means within said exposure compartment and acting in conjunction with said focussing lens system for focussing the image of a document placed on said document rest at an exposure station overlying said development processing compartment;

microfilm unit production means including drive roll means which may be alternately actuated to advance said film intermittently to bring successive film frames thereof to said exposure station whereby said successive frames are exposed to said image-wise light and cutter means located downstream of said exposure station in terms of film advance and actuable to cut said film subsequent to said continuous movement thereof, whereby the leading end portion of said film constituting an exposed microfilm unit is detached from the remainder of said film; and development processing means provided in said development processing compartment and including at least one bath containing developer solution, rinsing means and drying means, and film forwarding means for moving successively detached microfilm units through said entry opening and through said development processing compartment whereby said film units may be processed by said development processing means, and for moving said processed microfilm units through said exit opening to the exterior of said apparatus with said development processing compartment constituting a compact and easily accessible unit separate from and to one side of said exposure compartment.

2. In a microfilm apparatus employing film which is in roll form and which includes at least one layer of a silver halide emulsion, and said apparatus includes means for exposing said film to image-wise reflected light from documents to be microfilmed and means for development processing of said exposed film, whereby microfilm copies of said documents may be obtained, the improvement wherein said apparatus comprises:

a main housing including outer walls, partition wall means mounted within said main housing outer walls and defining with said outer walls said main housing into an upper, exposure compartment and a compact, easily accessible lower, development processing compartment separate from said exposure compartment to one side thereof and below said exposure compartment, said partition wall means defining an entry opening at the top of said development processing compartment at one end thereof and said outer wall means at the opposite end of said development processing compartment carrying an exit opening remote from said entry opening and communicating the interior of said development processing compartment to the exterior of said apparatus;

an exposure system within said exposure compartment including a horizontal, transparent document rest provided within the top of said main housing at the upper portion of said exposure compartment, a first mirror mounted below and inclined relative to said document rest and positioned with said exposure compartment, a smaller, second mirror disposed parallel to said first mirror and to one side of said exposure compartment, a focussing lens system provided within a lower portion of said exposure compartment to the same side as said second mirror and overlying said development and processing compartment for focussing the image of a document placed on said document rest at an exposure station within said exposure compartment;

microfilm unit production means including drive roll means which may be alternately actuated to advance said film intermittently to bring sucessive film frames thereof to said exposure station whereby said successive film frames are exposed to said image-wise light for advancing said film a certain number of frames unexposed and past said exposure station subsequent to exposure of a set number of said frames in intermittent fashion, and cutter means located downstream of said exposure station in terms of film advance and actuable to cut said film subsequent to said continuous movement thereof, whereby the leading end portion of said film constituting an exposed microfilm unit is detached from the remainder of said film and there is produced an unexposed portion which precedes a subsequent microfilm unit, and wherein said film is divided into successive independent microfilm units each including an exposed portion and a set number of exposed frames;

development processing means provided in said development processing compartment and including at least one bath containing developer solution, rinsing means and drying means, and film forwarding means for moving successively detached microfilm units through said entry opening and through said development processing compartment, whereby said film units may be processed by said development processing means, and for moving said processed microfilm units through said exit opening to the exterior of said apparatus; and blower means provided in an upper portion of said exposure compartment such that said entry opening and said exit opening acting in conjunction with said blower means effects air flow in sequence through said exposure compartment through said entry opening across said development processing means and through said exit opening to the exterior of said apparatus to prevent harmful vapors from passing from said development processing compartment back through said exposure station to said exposure compartment, while at the same time ready access may be had to said separate, compact development processing compartment to facilitate film loading, replenishment or change of processing solution and cleaning of said development processing means therein.

* * * * *